(12) United States Patent
Abe et al.

(10) Patent No.: US 6,721,637 B2
(45) Date of Patent: Apr. 13, 2004

(54) HYBRID VEHICLE

(75) Inventors: Tatsuo Abe, Kanagawa (JP); Eiji Inada, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 90 days.

(21) Appl. No.: 10/196,162

(22) Filed: Jul. 17, 2002

(65) Prior Publication Data

US 2003/0015874 A1 Jan. 23, 2003

(30) Foreign Application Priority Data

Jul. 18, 2001  (JP) ..................................... 2001-217477

(51) Int. Cl.[7] .................................................. B60R 6/04
(52) U.S. Cl. .............................. 701/22; 701/25; 701/26; 701/201; 180/65.8
(58) Field of Search ............................. 701/22, 23, 24, 701/25, 26, 201, 202; 180/65.3, 65.1, 65.8

(56) References Cited

U.S. PATENT DOCUMENTS

| 6,123,163 A | * | 9/2000 | Otsu et al. | 180/65.8 |
| 6,260,644 B1 | * | 7/2001 | Otsu | 180/65.3 |
| 6,380,640 B1 | * | 4/2002 | Kanamori et al. | 290/40 C |

FOREIGN PATENT DOCUMENTS

JP          07-075210          3/1995

\* cited by examiner

*Primary Examiner*—Thomas G. Black
*Assistant Examiner*—Arthur D. Donnolly
(74) *Attorney, Agent, or Firm*—Foley & Lardner

(57) ABSTRACT

A point at which an external power supply is installed is registered in map data in a map information device as a base point. An EV running area centered on the base point is registered as map data in the map information device, and EV running is performed when a vehicle is in the EV running area.

13 Claims, 11 Drawing Sheets

HYBRID VEHICLE

FIELD OF THE INVENTION

This invention relates to control of a hybrid vehicle which changes over between EV running and HEV running.

BACKGROUND OF THE INVENTION

JP-A-H7-75210 published by the Japanese Patent Office in 1995 discloses a hybrid vehicle provided with a generator, an engine which drives this generator, a motor which drives the vehicle, and a battery. This hybrid vehicle switches between EV running where the motor is driven only with the electric power stored in the battery without operating the engine, and HEV running where the engine is operated and at least one of the engine or the motor is used to run the vehicle.

SUMMARY OF THE INVENTION

One advantage of hybrid vehicles is EV running which is silent and pollution-free. It is desirable to perform EV running in a specific place and a specific time zone. For example, if HEV running where the engine is operated is performed when going to the office in the early morning from home or returning late at night, the noise emitted by the engine may annoy the neighborhood, but in the case of EV running, there will be little noise and the neighborhood will not be annoyed.

It is therefore an object of this invention to make an area centered on a home or company as an EV running area, and to enable EV running when traveling from the home to the office early in the morning or when returning late at night.

In order to achieve above object, this invention provides a hybrid vehicle which includes a generator, an engine which drives the generator, a motor which drives the vehicle and a battery connected to the generator and motor, and performs EV running wherein the vehicle runs under the motor driven with electric power stored in the battery without operating the engine, and HEV running wherein the engine is operated and the vehicle runs under at least one of the engine and the motor, comprising an external charge device which charges the battery using an external power supply, a map information device which includes map data and recognizes the present position of the vehicle on the map data, and a controller.

The controller functions to register a point at which the external power supply is installed in the map data in the map information device as a base point, register an EV running area centered on the base point in the map data in the map information device based on a charge value of the battery, and perform EV running when the vehicle is in the EV running area.

The details as well as other features and advantages of this invention are set forth in the remainder of the specification and are shown in the accompanying drawings.

DESCRIPTION OF THE PREFERRED EMBODIMENTS

Figure 1:
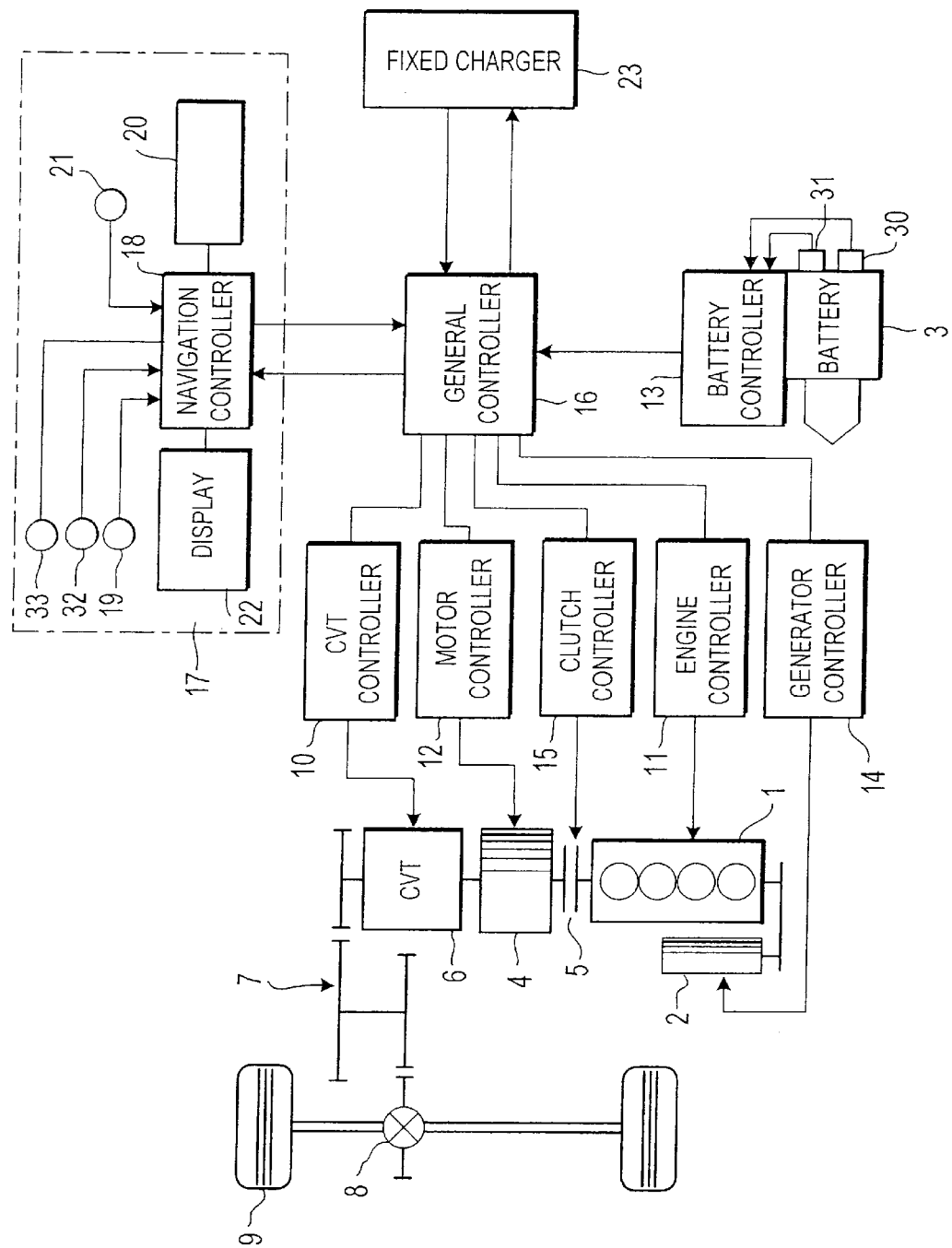
FIG. 1 is a schematic diagram of the hybrid vehicle relating to this invention.

Referring to FIG. 1 of the drawings, a power train of a parallel hybrid vehicle relating to this invention comprises an engine 1, a generator 2 which is connected with an output shaft of the engine 1 and converts the power of the engine 1 into electric power, a battery 3 which makes the generator 2 function as a starter motor by supplying electric power to the generator 2 when the engine starts, and stores the power generated by the generator 2, a motor 4 which drives the vehicle with the electric power of the battery 3, or recovers the kinetic energy of the vehicle when it decelerates and supplies electric power to the battery 3, a clutch 5 which connects or disconnects the engine 1 and motor 4, and a continuously variable transmission (CVT) 6.

The CVT 6 is a belt CVT which transmits power by a metal belt looped around pulleys. The torque of the engine 1 and motor 4 is input to the input shaft of the CVT 6, and is transmitted to drive wheels 9 via, a gear set 7 and a differential gear 8 from an output shaft of the CVT 6.

A CVT controller 10 adjusts primary pressure and secondary pressure by an oil pressure actuator, and controls the speed ratio of the CVT 6 so that the rotation speed of the input shaft of the CVT 6 is equal to a target input rotation speed from a general controller 16. The CVT controller 10 calculates the speed ratio from the input shaft rotation speed and output shaft rotation speed of the CVT 6, and sends the result to the general controller 16. An engine controller 11 controls a throttle valve opening based on a target engine torque from the general controller 16, and controls the torque of the engine 1.

A motor controller 12 controls the torque of the motor 4 based on the target motor torque from the general controller 16. A battery controller 13 calculates the charge state SOC (or the charge amount P) based on the current of the battery 3 detected by a current sensor 30 and the voltage of the battery 3 detected by a voltage sensor 31, and sends the result to the general controller 16.

In this embodiment, the maximum power which can be output (discharged) decreases with reduction of the charge amount of the battery 3, and the state wherein the maximum power which can be output coincides with the minimum guaranteed value for driving the motor 4, is taken as 0% charge state. Moreover, the maximum power which can be input (charged) decreases as the charge state of the battery 3 increases, and the state wherein the maximum power which can be input coincides with the minimum guaranteed value for receiving the deceleration regenerated power of the motor 4, is taken as 100% charge. The charge state SOC is calculated on this basis.

A generator controller 14 controls the generator 2. The generator controller 14 controls the torque of the generator 2 based on a command value from the general controller 16. For example, when the vehicle departs from the state where the engine 1 stops automatically during a brief vehicle stop, etc., the generator 2 is rotated as a starter motor, and the engine 1 is re-started automatically.

A clutch controller 15 performs engaging and release of the clutch 5 based on clutch engaging instructions from the general controller 16. For example, during very low speed running when the efficiency of the engine 1 is poor, the clutch 5 is released, and the vehicle is made to run only by the motor 4. During deceleration, the clutch 5 is released, the motor 4 is used as a generator and energy is recovered. The clutch 5 is engaged during full throttle acceleration, and the vehicle is then run by both the engine 1 and the motor 4.

Signals are input to general controller 16 from an accelerator sensor 32 and a vehicle speed sensor 33, and three target values (target input rotation speed, target engine torque, target motor torque) are calculated based thereon. The general controller 16 outputs the target input rotation speed to the CVT controller 10, outputs the target engine torque to the engine controller 14, and outputs the target motor torque to the motor controller 12.

A navigation device 17 (map information device) is provided in the vehicle. The navigation device 17 comprises a navigation controller 18, a gyroscope (angular velocity sensor) 19, a recording medium 20 (for example, a hard disk, DVD-RAM, memory, etc.) on which map data is recorded and which can be written, a GPS antenna 21 and a liquid crystal display (LCD) 22. The navigation controller 18 computes the present position and the travel direction of the vehicle based on a signal from the gyroscope 19, a signal from the vehicle speed sensor 33, a signal from the GPS antenna 21 and the data from the recording medium 20. This information is displayed on the display 22 as required by the user. Instead of the signal from the GPS antenna 21, a beacon signal may be used.

The above-mentioned controllers 10–16 and 18 comprise one, two or more microprocessors, a memory and an input-and-output interface.

This hybrid vehicle switches between EV running where the motor 4 is driven only with the electric power stored in the battery 3 without operating the engine 1, and HEV running where the engine 1 is operated and at least one of the engine 1 or the motor 4 is used to run the vehicle. All the states where the engine 1 is driven are HEV running, and HEV running is as follows:

(a) When the clutch 5 is engaged and the vehicle is run only by the engine 1, (b) When the clutch 5 is engaged and the vehicle is run by the engine 1 and the motor 4, (c) When the clutch 5 is released, and the vehicle is run only by the motor 4 while the engine 1 drives the generator 2 and electricity is generated by the generator 2.

The hybrid vehicle is made to operate as follows in this embodiment in these cases. The place (for example, a home) where the vehicle is charged periodically with a fixed charger 23 (external charge device) which charges by using a commercial power supply (external power supply) for hybrid vehicles, is registered as a base point A. Before departure, the vehicle is charged until the charge state SOC of the battery 3 becomes a predetermined value SOC_chg (for example, SOC_chg=80%). EV running is performed to a destination (for example, a company) C from the base point A. When the charge state SOC decreases as a result of EV running and becomes a minimum value SOC_low (for example, SOC_low=10%), i.e., when the electric power of the battery 3 is used up, the vehicle switches to HEV running, and the position of the change-over is registered into the map data as a point B. In this case, an EV running area centered on the base point A is designated based on the point B (described later). After switching to HEV running, power generation is performed. If the charge state SOC is reached the normal target charge state SOC_normal (for example, SOC_normal=50%), the vehicle runs to a target point C while performing control to maintain the charge state. This situation is shown in the upper part of FIG. 6.

On the other hand, when returning from the destination C, supposing the vehicle follows the same route, for example, as it enters the EV running area from the above-mentioned point B, it switches to EV running from HEV running, and is made to reach the base point A by EV running. When the vehicle reaches the base point A, the charge state SOC is the minimum value SOC_low, i.e., the electric power of the battery 3 is used up. Then, the fixed charger 23 charges in preparation for the next running at the base point A.

Thus, an external charge is performed at the base point A for every round trip. However, external charge may be performed by a mobile (portable) charger at places other than the base point A. If such an unexpected external charge is performed and this external place is registered as the base point A incorrectly, it may occur that the original base point A cannot be reached in the EV running state. Therefore, the general controller 16 and the navigation controller 18 register the base point A as follows.

1. Base Point Registration (1) When the following two conditions (a) and (b) are satisfied, it is determined that external charge has been performed by the fixed charger 23.

(a) The signal from a selection switch or the recognition signal from the external charger indicates that the external charger is the fixed charger 23.

(b) The charging pattern coincides with the charge pattern of the fixed charger 23.

The selection switch of (a) is a change-over switch which selects the type of charger (installed or mobile) used for external charge at the base point, when the user knows the kind of charger beforehand. This signal is input into the general controller 16. The recognition signal from the external charger of (a) is a determination signal automatically transmitted to the general controller 16 from the external charger at the time of connecting the a charge connector even if the user does not choose the kind of charger.

The charge pattern of (b) may be Constant Current Charge, Constant Voltage Charge, Constant Power Charge or a combination thereof. The charge pattern is decided beforehand according to the charger. The charge pattern of the charger which is installed at the base point A is prestored, and it is determined whether charge was performed by the fixed charger 23 installed at the base point or by another mobile (portable) charger according to whether or not this pattern coincides with the present charge pattern.

(2) When the external charge is complete and it was performed by the fixed charger 23, the position at which external charge was performed is registered as the base point A on the map data recorded on the recording medium 20.

Next, the general controller 16 and the navigation controller 18 register the EV running area together as follows.

2. EV Running Area Registration (1) When the charge state SOC falls to the minimum value SOC_low and the vehicle switches to HEV running after EV running start after base point A registration, the position of the vehicle at the switching timing is registered on the map data currently recorded on the recording medium 20 as the point B.

(2) The EV running mileage between the base point A and point B is computed on the map data. The position of equal route distance to the EV running mileage is searched, and the searched position is registered on the map data recorded on the recording medium 20 as a point Bn (B1, B2 . . . , Bn). This will be described in detail referring to FIG. 2.

Figure 2:
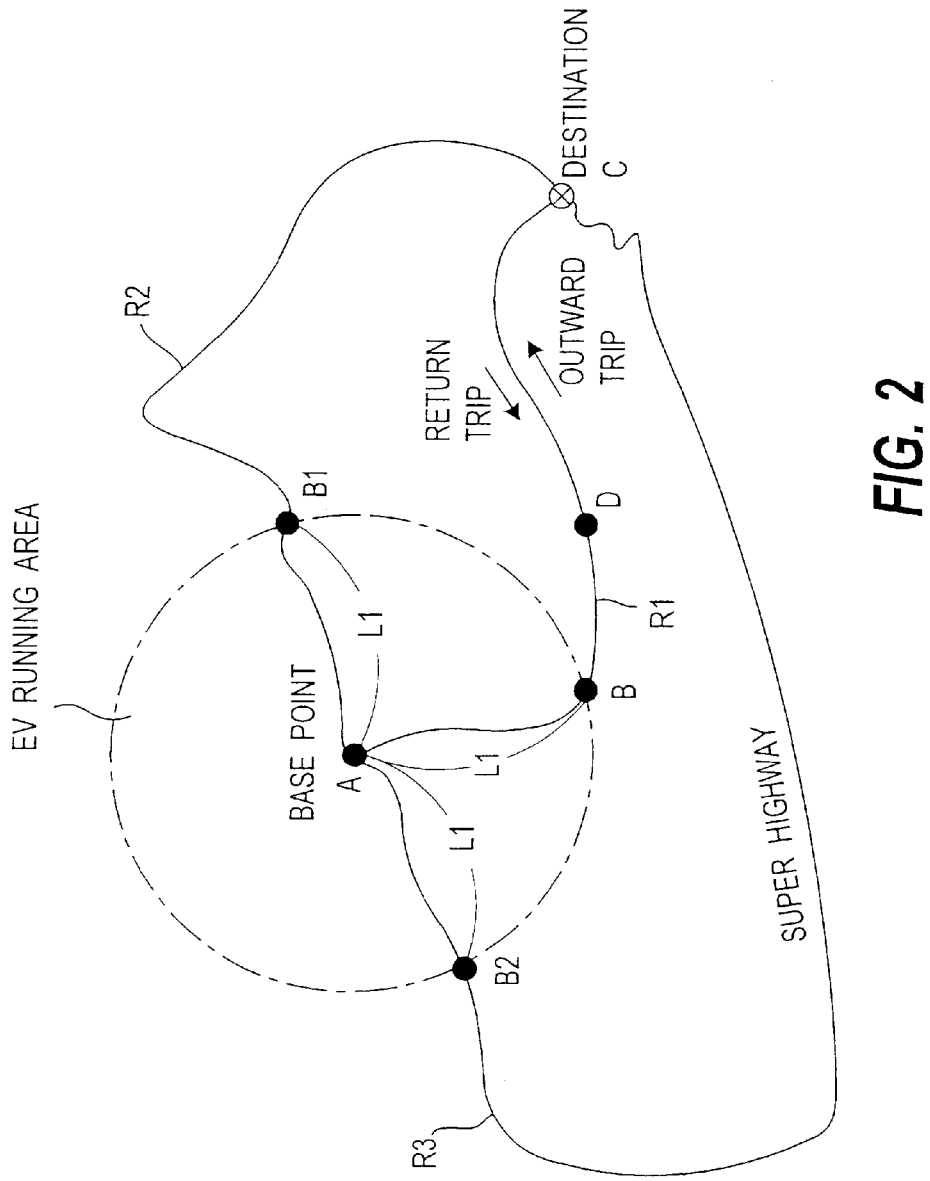
FIG. 2 is a diagram for describing an EV running area.

FIG. 2 shows the map data recorded on the recording medium 20 as a map. If a route R1 was followed on this occasion when there were three routes going to the destination C from the base point A, the point B lies on this route R1. Then, the mileage L1 between the base point A and point B is calculated, positions on other routes R2, R3 which are at equal route distances to the mileage L1 centered on the base point A are searched, and these searched positions are registered as points B1 and B2. The reason for registering the EV running area (that is, B, B1, B2) is to know the limit specific to the vehicle in which EV running is possible centered on the base point A when the vehicle is charged using the fixed charger 23. Even when the user substitutes the other routes R2, R3 and returns from the destination C to the base point A, the vehicle can switch to EV running from the point B1 or B2.

The base point registration and the EV running area registration performed by the general controller 16 and the navigation controller 18, will be described in detail based on the following flowcharts.

Figure 3:
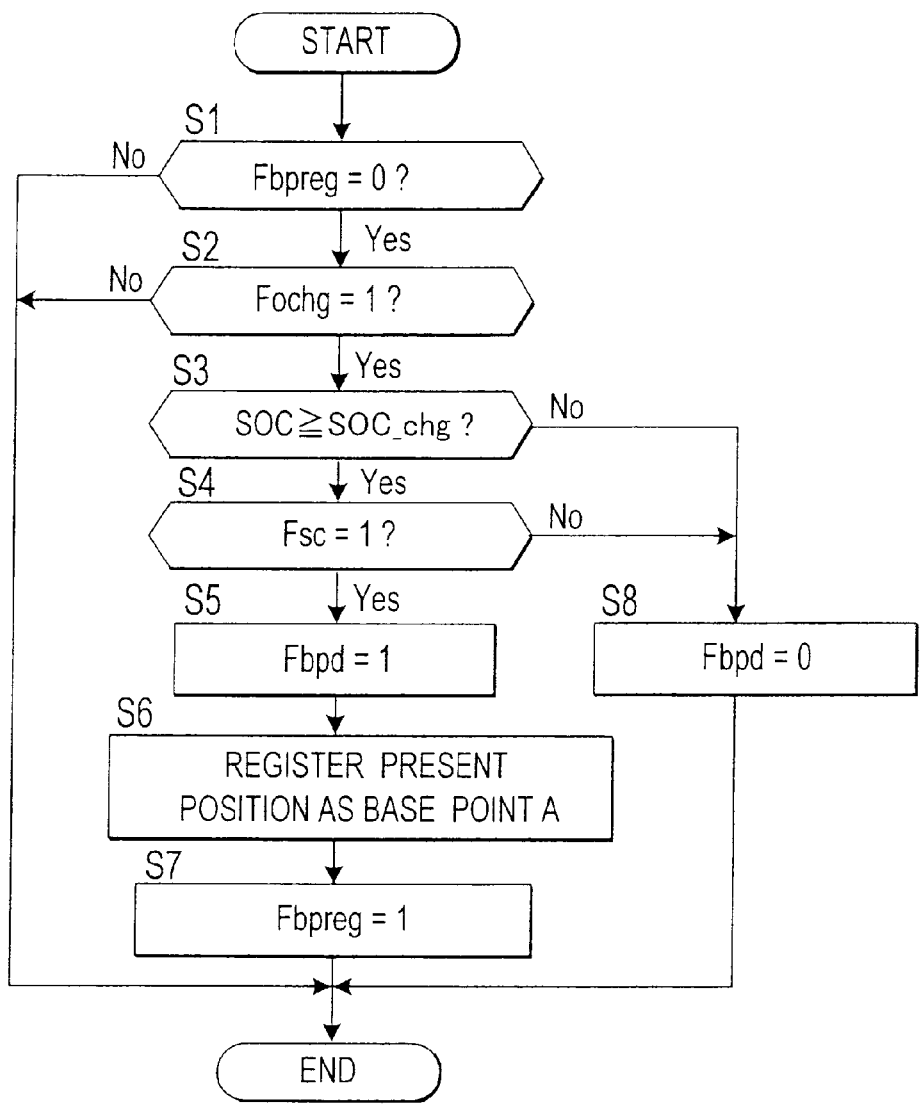
FIG. 3 is a flowchart showing a base point registration processing.

FIG. 3 is for performing base point registration and is performed at a fixed interval after the start of external charge. Although the base point is not limited to one fixed position, as control will become complicated if there are plural base points or if the base point moves even when there is one base point, here the simple situation will be described where there is only one base point which does not move. In this case, it is sufficient if base point registration is performed once.

In a step S1, a base point registration flag Fbpreg is examined. If the flag Fbpreg is "0", base point registration has not been completed, and if the flag Fbpreg is "1", base point registration has been completed. If the flag Fbpreg is "0", the routine proceeds to a step S2, and an external charge flag Fochg is examined. Although not shown, the external charge flag Fochg is set to "1" by the general controller 16 in the following cases:

(a) The user removed the charge connector during external charge.

(b) The user turned OFF the power supply of the external charger during external charge.

(c) The general controller 16 determined that the external charge has been completed based on the charge state SOC from the battery controller 13 during external charge.

When the external charge flag Fochg is "1", the routine proceeds to a step S3, and the charge state SOC is compared with a predetermined value SOC_chg. This is for determining whether electric power required for EV running was charged to the battery 3. If the charge state SOC is more than predetermined value SOC_chg, the routine proceeds to a step S5 and a fixed charger flag Fsc will be determined. The setup of the flag Fsc will be described referring to FIG. 4. The flowchart of FIG. 4 is performed during standby, for example, when the ignition switch is turned off.

Figure 4:
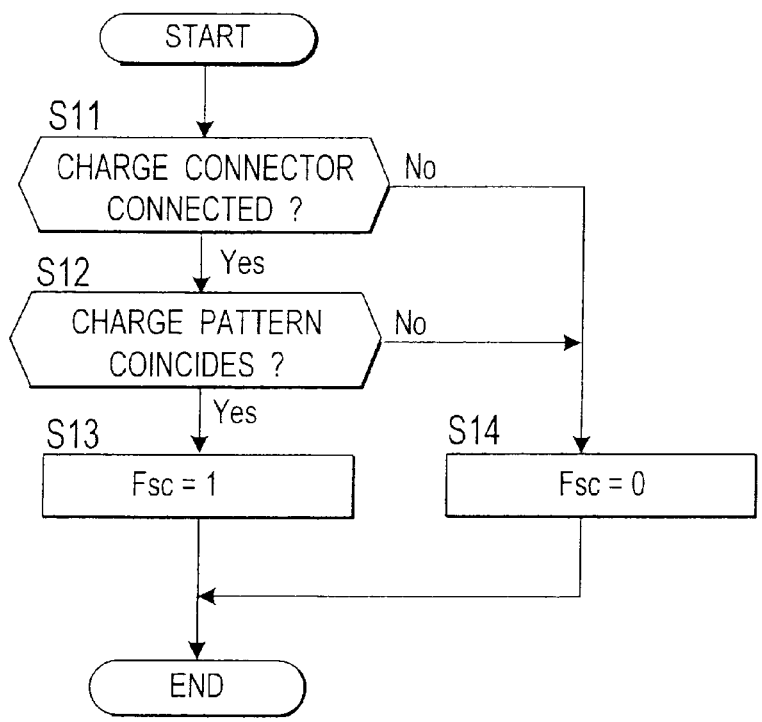
FIG. 4 is a flowchart showing a determination processing of a fixed charger.

In steps S11 and S12 of FIG. 4, it is determined whether or not the charge connector is connected and it is determined whether or not the present charge pattern coincides with a prestored charge pattern. A charge port is provided in the vehicle to charge the battery 3 by external charge. The external charge is started by connecting the charge connector of the external charger to this charge port, and turning ON the power supply of the external charger from outside. In this case, in the fixed charger 23, a detection switch which turns ON when the charge connector is connected to the charge port, is provided in the charge connector. The signal from this detection switch is input into the general controller 16 as a connector connection signal. The charge pattern which is prestored is the charge pattern of the fixed charger 23.

Therefore, in the general controller 16, if the signal from the detection switch is ON and the charge pattern coincides, it is determined that charging is performed by the fixed charger 23 installed at the base point, the routine proceeds to a step S13, and the fixed charger flag Fsc is set to "1". If the signal from the detection switch is OFF or the charge pattern from the detection switch does not coincide with the prestored pattern even when the signal from the detection switch is ON, it is determined that charging is not performed by the fixed charger 23, the routine proceeds to a step S14, and the fixed charger flag Fsc is set to "0".

Returning to FIG. 3, if the fixed charger flag Fsc is "1" in the step S4, the routine will proceed to steps S5 and S6, the base point determining flag Fbpd is set to "1", and the navigation controller 18 is directed to register the present position on the map data as the base point A. On receiving this instruction, the navigation controller 18 registers the present position into the map data as the base point A.

As base point registration is now complete, the base point registration flag Fbpreg is set to "1" in a step S7. When this base point registration flag Fbpreg is set to "1", the routine cannot proceed from the step S1 to the step S2 the next time the routine is executed.

On the other hand, when the fixed charger flag Fsc is "0", the routine proceeds from the step S4 to a step S8, the base point determining flag Fbpd is set to "0", and processing is terminated. Thus, even when the charge state SOC is charged by the mobile charger more than predetermined value SOC_chg, the position where charge is performed is not registered as the base point. When based on a mobile charger, base point registration is not carried out for preventing incorrect recognition of the base point. If external charge were performed by the mobile charger at a position which is not the base point and base point registration were performed incorrectly, it might occur that the electric power of the battery 3 is used up before reaching the base point and there is a shift to HEV running.

Figure 5:
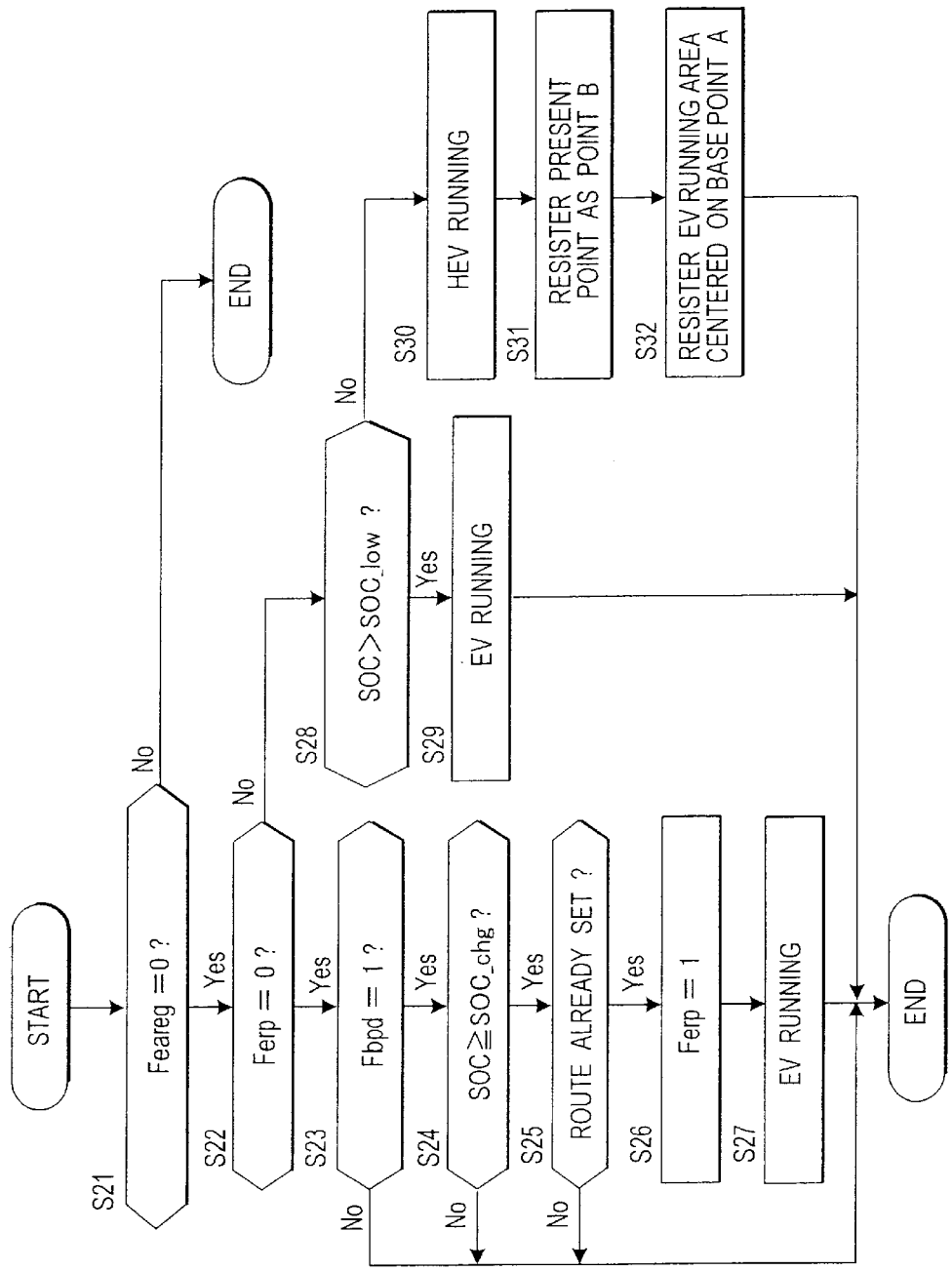
FIG. 5 is a flowchart showing a registration processing of an EV running area.

FIG. 5 shows EV running area registration processing. The hybrid vehicle is also started by switching the ignition switch ON. Therefore, when the ignition switch is set to ON, the flowchart of FIG. 5 is performed at a fixed interval. As the base point is one position and the case is considered where the base point does not move, it is sufficient if registration of the EV running area centered on the base point is performed once.

In a step S21, an EV running area registration flag Feareg is examined. If the EV running area registration flag Feareg is "0", registration of the EV running area is not complete, and if the running area registration flag Feareg is "1", registration of the EV running area is complete. In the initial state, as the EV running area registration flag Feareg is "0", the routine proceeds to a step S22 and an EV running permission flag Ferp is determined. In the initial state, the EV running permission flag Ferp is "0". Therefore, the routine proceeds to steps S23, S24, S25, and it is examined whether or not all the following conditions are satisfied.

(a) The base point determining flag Fbpd is "1" (the base point A is already determined).

(b) The charge state SOC is more than the predetermined value SOC_chg (for example, SOC_chg=80%).

(c) The route is already set up.

The reason for condition (a) is because the EV running area is set centered on the base point A, so the EV running area cannot be designated unless the base point A is determined. The reason for condition (b) is because if the charge state SOC is not larger than the predetermined value SOC_chg even after charging has completed, EV running cannot be performed throughout the EV running area. The reason for condition (c) is that in the hybrid vehicle according to this invention, it is assumed that the user inputs the destination before starting to drive the vehicle, i.e., at the base point A. If the user inputs the destination, the route to the destination will be searched by the navigation controller 18, and a search result will be transmitted to the general controller 16.

When any of the above-mentioned conditions (a)–(c) is not satisfied, processing is ended, and the EV running area is not registered. When one of the conditions (b) and (c) is not satisfied, the external charge may be performed again or the user may be urged to set the route.

When all the above-mentioned conditions (a)–(c) are satisfied, the routine proceeds to steps S26, S27, the EV running permission flag Ferp is set to "1", and EV running is commanded. When the EV running permission flag Ferp is set to "1", the routine proceeds to the step S28 on the next occasion the routine is executed. The step S28 compares the present charge state SOC and present minimum value SOC_low. Here, the minimum value SOC_low is a charge state where the charge amount of the battery 3 is a quantity for which it is impossible to extract the output required for EV running.

As EV running is possible if the present charge state SOC is larger than the minimum value SOC_low, the routine proceeds to a step S29, and EV running is continued. The charge state SOC decreases, the more EV running is continued away from the base point A. If the present charge state SOC drops below the minimum value SOC_low, as it is impossible to continue EV running any further, the routine proceeds to from the step S28 to a step 30, and changes over to HEV running. In a step S31, the navigation controller 18 is directed to register the present position at which there was a change-over to HEV running, as the point B. In response to these directions, the navigation controller 18 registers the present position on the map data as the point B. The point B represents the boundary of the EV running area.

In a step S32, the navigation controller 18 is directed to register the EV running area centered on the base point A. In response to these directions, as shown in FIG. 2, the navigation controller 18 registers the EV running area on the map data.

Next, on the return trip from the destination C, the general controller 16 and the navigation controller 18 perform high charge state shift control prior to EV running. The navigation controller 18 performs learning control of the EV running area. This is described by a model showing this in FIG. 6.

Figure 6:
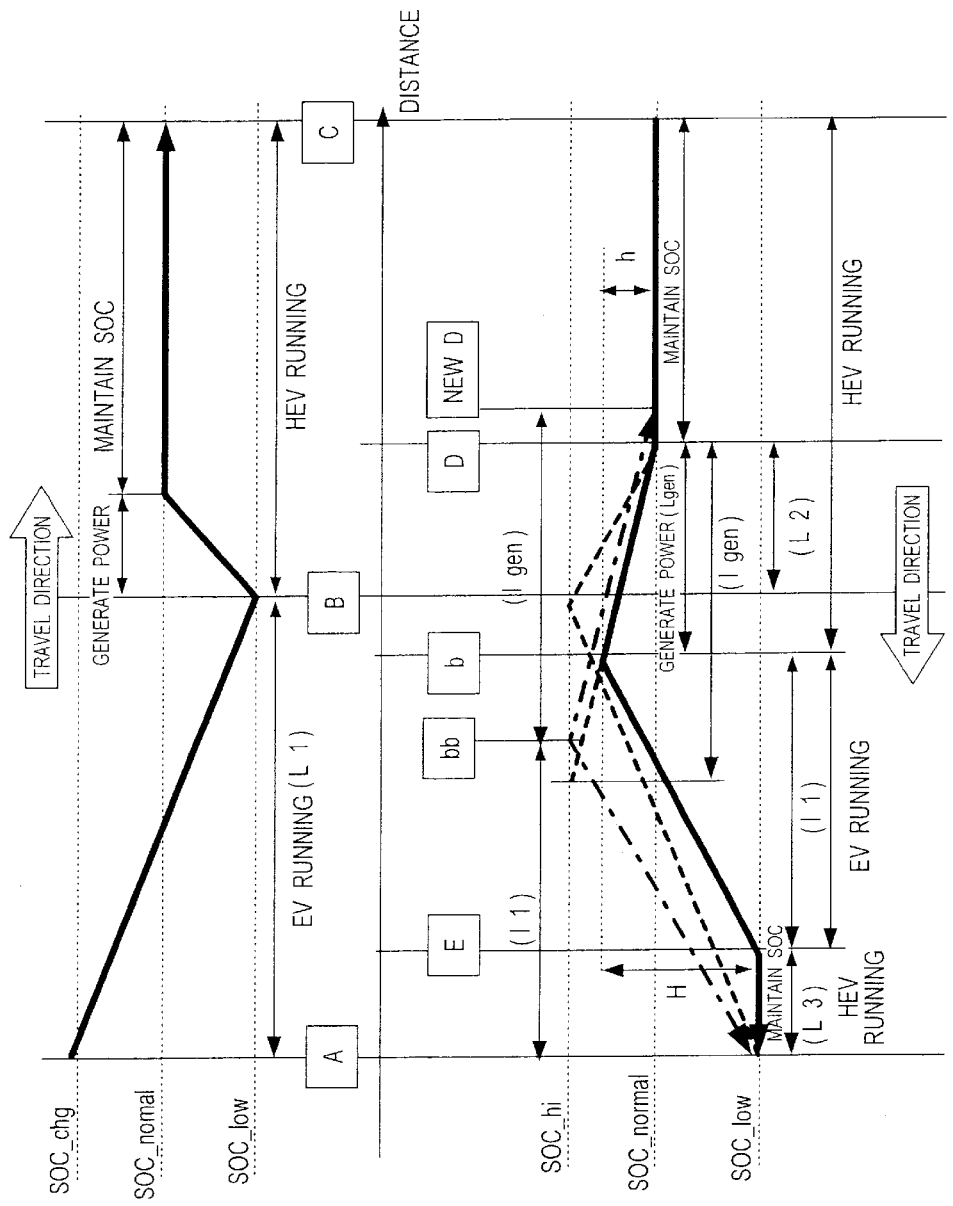
FIG. 6 is a diagram showing a model of a high charge state shift control prior to EV running, and a learning control of the EV running area.

The upper part of FIG. 6 shows the change of the charge state SOC on the outward trip where the route R1 shown in FIG. 2 is followed, and the lower part of FIG. 6 shows the charge state SOC on the return trip where the same route R1 is followed. As in FIG. 2, "A" at the left-hand end is the base point, "B" is the point where there is a change-over from EV running to HEV running on the outward trip, and "C" at the right-hand end is the destination.

3. High Charge State Shift Control Prior to EV Running (1) The return trip from the destination C is starts with HEV running. When the point B which is the boundary of the EV running area is approached, the target value of the charge state will switch to a high target charge state SOC_hi (for example, SOC_hi=70%) which is higher than the normal target charge state SOC_normal at the point D before the point B (double dashed line of FIG. 8). Thus, the power generation amount of generator 2 is made to increase, and the charge state SOC (the charge amount) of the battery 3 is increased.

The aforementioned high target charge state SOC_hi is a fixed value. This is because with the engine under HEV running or regeneration, a change of running load occurs, and the charge current cannot be finely controlled as with external charging. The high charge state SOC_hi is set to a value lower than the predetermined value SOC_chg by about 10–20%. To increase the power generation amount of the generator 2, the engine rotation speed and generator rotation speed may be increased, or the load (absorption torque) of the generator 2 may be increased. The method which gives higher engine efficiency is chosen. When raising the engine rotation speed, the vehicle speed is maintained by varying the speed ratio of CVT 6 appropriately.

(2) The position D which starts high charge state shift control is determined as follows.

(a) The time t required to charge the battery 3 to the high target charge state SOC_hi by the power generated by the generator 2 is computed by the next equation:

$$t[hour]=(SOC\_hi[\%]-SOC[\%])/Pgc[\%/hour] \qquad (1)$$

where,

SOC_hi: high target charge state (fixed value)

SOC: present charge state

Pgc: generated power corresponding value.

The generated power corresponding value Pgc is a generated power corresponding value at the time of increasing the power generation amount.

The charge state SOC is effectively equal to a value indicated in percent by dividing the charge amount by the maximum charge amount. When the temperature of the battery 3 is low or when the battery 3 deteriorates, as the maximum charge amount which is the denominator of this equation decreases, the charge state SOC varies even if the charge amount is the same. Therefore, when controlling based on the charge state SOC, an error occurs in the control corresponding to this.

When considering the case when the battery 3 is at a low temperature or has deteriorated, it is necessary to use the charge amount P[Wh] instead of the charge state SOC[%]. In this case, the vertical axis in FIG. 6 is taken as the charge amount P instead of the charge state SOC[%], and instead of equation (1), the power generation time t required to charge to the target charge amount P_hi is computed by the next equation:

$$t[hour]=(P\_hi[Wh]-P[Wh])/Pg[W] \qquad (1)$$

where,

P_hi: high target charge amount

P: present charge amount

Pg: generated electric power

The high target charge amount P_hi varies with the maximum charge amount of the battery 3. The present charge amount P is measured using a well-known means (for example, electric power addition, internal resistance measurement of the battery 3, etc.).

(b) The mileage L2 required to charge the battery 3 to the high target charge state SOC_hi (or high target charge amount P_hi) is computed by the next equation:

$$L2[km] = t[hour] \times VSP\_ave[km/hour] \quad (2)$$

where,

VSP_ave: average vehicle speed

The average value for a fixed distance is used for the average vehicle speed VSP_ave.

(c) If the position at a distance L2 back to the destination C side from the point B is determined as the point D. When the present position reaches the point D, the routine will shift to the power generation mode which increases the power generation amount and increases the charge state SOC. If it shifts to the power generation mode, the charge state SOC will follow the high target charge state SOC_hi (dashed line from the point D in the lower part of FIG. 6). In FIG. 6, for convenience, this following motion is approximated by a straight line. Theoretically, in the lower part of FIG. 6, as shown by the dashed line, it should increase towards the high target charge state SOC_hi and reach the high target charge state SOC_hi at the point B. However in practice, as shown by the solid line, it becomes a more gradual slope than the dashed line, and it may occur the high target charge state SOC_hi is not reached at the point B. Such a case may occur when the electric power of the a battery 3 is used for driving the vehicle, and a required charge cannot be performed (for example, when drive loads are high due to hill climbing or sudden acceleration).

Thus, in view of the possibility of such a situation, learning control of the EV running area is performed as follows.

4. Learning Control of EV running Area (1) The present charge state SOC (or the present charge amount P) is calculated sequentially while running in the power generation mode from the point D. Then, assuming that EV running was performed from the charge state SOC (or charge amount P), a distance Lev in which EV running is possible is computed by the following equation:

$$Lev[km] = (SOC - SOC\_low)/Rfconc[\%/km] \quad (3)$$

where,

SOC_low: minimum value of the charge state for carrying out EV running

SOC: present charge state

Rfconc: power consumption rate corresponding value on outward trip

The power consumption rate corresponding value Rfconc on the outward trip is the slope angle of the solid line between the base point A and the point B in the upper part of FIG. 6.

When the charge amount P is used instead of the charge state SOC, assuming that EV running was performed from the charge amount P, the distance Lev in which EV running is possible is computed by the next equation instead of equation (3):

$$Lev[km] = (P - P\_low)/Rfcon[Wh/km] \quad (3)'$$

where,

P_low: minimum value of charge amount for carrying out EV running

P: present charge amount

Figure 8:
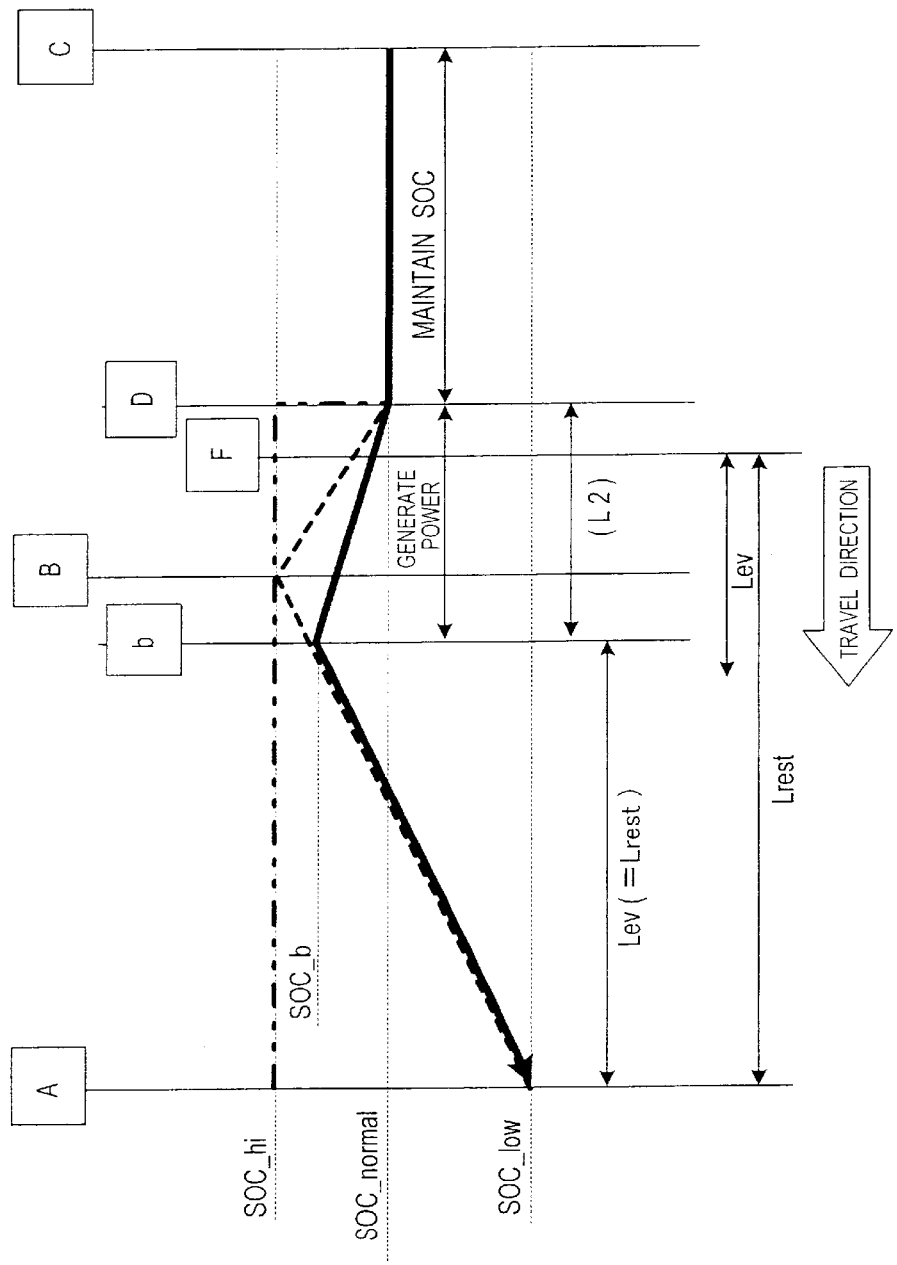
FIG. 8 is a diagram showing the model of the high charge state shift control prior to EV running.

Rfcon: power consumption rate on outward trip (2) The residual distance Lrest from the present position to the base point A is greater than the distance Lev in which EV running is possible at the beginning when high charge state shift control is started (see Lev and Lrest at the point F in FIG. 8). However, the charge state SOC increases the longer high charge state shift control is continued (i.e., the closer the vehicle approaches the base point A from point D), and the distance Lev in which EV running is possible becomes large. When the remaining distance Lrest from the present position to the base point A becomes equal to the distance Lev over which EV running can be performed, the engine 1 is suspended and it switches to operation in EV running as EV running to the base point becomes possible. The position where the remaining distance Lrest coincides with the possible EV running distance, Lev is registered as the point b in FIG. 8.

(3) If there is a shift to EV running from the point b, the charge state should theoretically become the minimum value SOC_low exactly at the base point A (solid line from the point b in FIG. 8). However, in practice, the power consumption rate varies due to the effect of the running load and the load of auxiliary devices from the point b. The following situations may arise:

(a) The electric power of the battery 3 is used up before reaching the base point A, and the charge state SOC becomes SOC_low (solid line from the point b in the lower part of FIG. 6).

Figure 7:
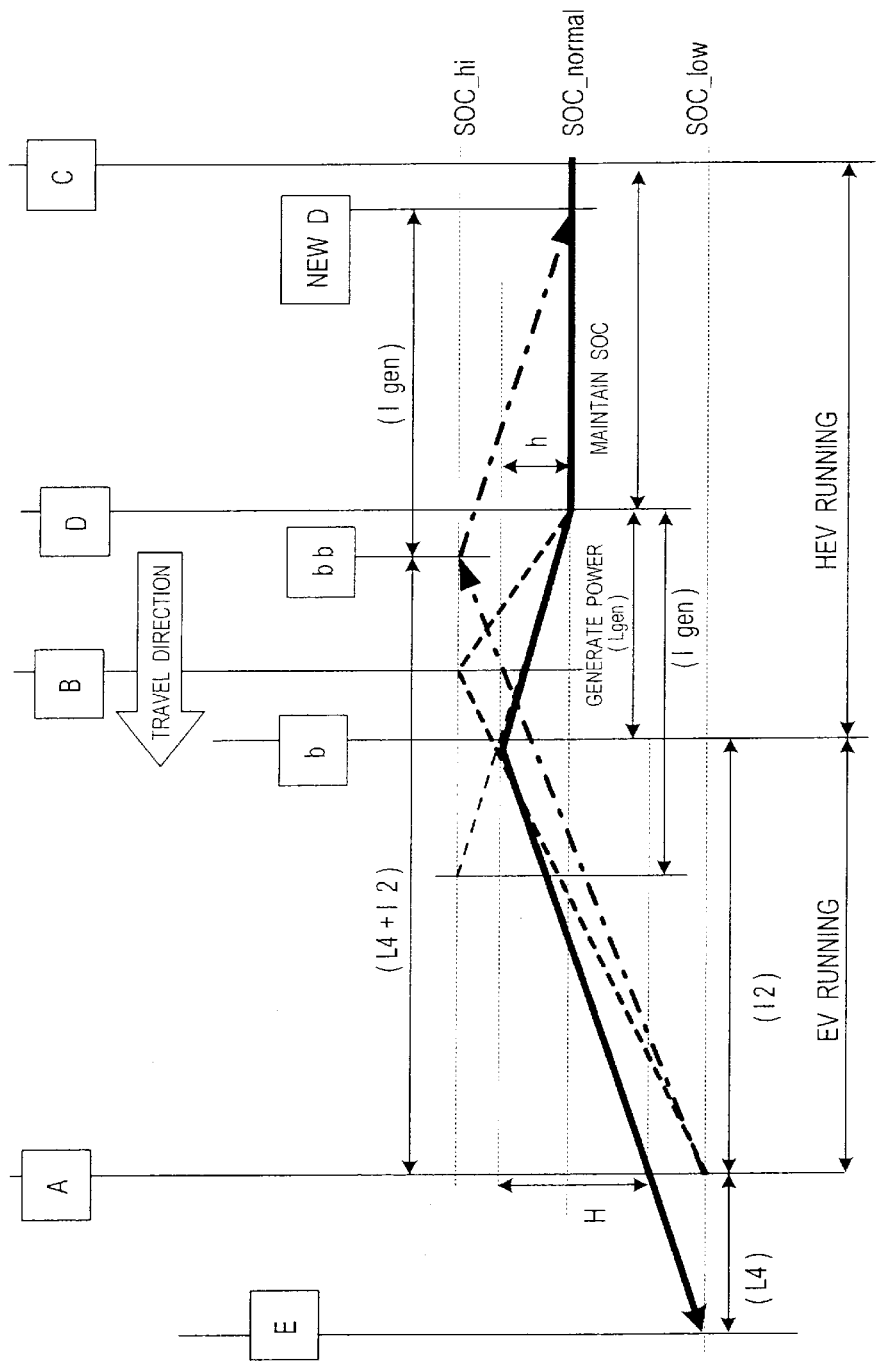
FIG. 7 is a diagram showing the model of the high charge state shift control prior to EV running, and the learning control of the EV running area.

(b) The electric power of the battery 3 is not used up when the base point A is reached, and the charge state SOC is larger than minimum value SOC_low (solid line from the point b of FIG. 7).

In the case of (a), although the vehicle is in the EV running area, it becomes impossible to continue EV running to the base point A. In the case of (b), EV running should have been performed earlier, so the EV running area is unnecessarily narrowed. The situation (a) is produced for example, when the electric power of the battery 3 is used to operate an air-conditioner (auxiliary device load), or when extra power is required to drive uphill than on flat ground. The situation (b) is produced on a downward slope, for example, the battery 3 is charged by regeneration.

Therefore, in the above mentioned case of (a) and (b), the boundary of the EV running area is updated so that the charge state SOC is the minimum value SOC_low exactly at the base point A, i.e., so that the electric power of the battery 3 is used up from the next time the vehicle runs.

(a) When the charge state SOC is the minimum value SOC_low before reaching the base point A The method of updating the boundary of the EV running area in this case will be described referring to the lower part of FIG. 6.

(i) From the position where the charge state SOC reaches the minimum value SOC_low, the engine 1 is started while maintaining the charge state, and switches to HEV running which generates electric power required for driving in real time.

(ii) The mileage from the point b to the position where there was a change-over to HEV running is stored as a distance l1 over which EV running was actually performed.

(iii) The position where there is return to the destination C from the base point A by this EV running mileage l1, is set as a point bb.

(iv) The power generation rate corresponding value Rgenc from the point D to the point b (showing the slope angle of the solid line from the point D to the point b in the lower part of FIG. 6) is further computed by the next equation:

$$Rgenc = (SOC\_b - SOC\_normal)/Lgen \qquad (4)$$

where,

SOC_b: charge state at point b,

SOC_normal: normal target charge state.

Lgen: distance actually run by high charge state shift control on the return trip.

The mileage lgen required for increasing the charge state SOC from the normal target charge state SOC_normal to the high target charge state SOC_hi is computed by the next equation using the power generation rate corresponding value Rgenc (the initial value is prespecified):

$$lgen = (SOC\_hi - SOC\_normal)/Rgenc \qquad (5)$$

When the charge amount P is substituted for the charge state SOC, the power generation rate Rgen from the point D to the point b is computed by the next equation instead of the equation (4):

$$Rgen = (P\_b - P\_normal)/Lgen \qquad (4)'$$

where,

P_b: charge amount at point b

P_normal: normal target charge amount.

The mileage lgen required to increase the charge amount P from the normal target charge amount P_normal to the high target charge amount P_hi is computed by the next equation instead of equation (5), using the power generation rate Rgen (the initial value is prespecified).

$$lgen = (P\_hi - P\_normal)/Rgen \qquad (5)'$$

(v) The position of this distance lgen back to the destination C from the point bb is set as the new point D.

For example, if the route and running conditions on the return trip from the same destination C were the same, on the next running occasion there would be a shift to high charge state shift control from the point D after this updating (new point D). The charge state SOC rises from the new D point in the lower part of FIG. 6 by the same slope angle as the solid line between the point D–point b, and reaches SOC_hi at the point bb. As the vehicle is changed to the EV running at a timing when the charge state is reached SOC_hi, the charge state SOC falls by the same slope angle as the solid line between the point b and point E, and the charge state SOC is the minimum value SOC_low at the base point A (dot and dash line from the new D in the lower part of FIG. 6).

If the point D is updated as shown in the lower part of FIG. 6 and the route and running conditions from the destination C are the same on the next running occasion, EV running can be performed up to the base point A on the next running occasion.

(b) The charge state SOC is not the minimum value SOC_low when the vehicle reaches the base point A.

In this case or in the case wherein the charge state is not SOC_low when charging starts using the fixed charger at the base point A, the method of updating the boundary of the EV running area will be described referring to FIG. 7.

(i) The mileage to the base point A from the point b is stored as a distance l2 over which EV running is actually performed.

(ii) The power consumption rate corresponding value Rconc under EV running from the point b to the base point A (average value) (slope angle of solid line from the point b to the base point A in FIG. 7) is computed by the next equation:

$$Rconc = (SOC\_b - SOC\_A)/l2 \qquad (6)$$

SOC_b: charge state at point b

SOC_A: charge state at point A

The distance L4 (estimated extra EV running distance) in which EV running is possible is computed by the next equation from the charge state SOC_A at the base point A using the power consumption rate corresponding value Rconc:

$$L4 = (SOC\_A - SOC\_low)/Rconc \qquad (7)$$

When the charge amount P is substituted for the charge state SOC, instead of equation (6), the power consumption rate Rcon under EV running from the point b to the base point A (average value) is computed by the following equation:

$$Rcon = (P\_b - P\_A)/l2 \qquad (6)'$$

P_b: charge amount at point b

P_A: charge amount at point A

The distance L4 (estimated extra EV running distance) in which EV running is possible is computed by the next equation from the charge amount P_A at the base point A using the power consumption rate Rcon:

$$L4 = (P\_A - P\_low)/Rcon \qquad (7)'$$

(iii) The position given by the sum total of this estimated extra EV running distance L4 and the EV mileage l2 back to the destination C from the base point A is set as the point bb.

The remainder is the same as that of (iv), (v) above (a). That is, the mileage lgen required to increase the charge state SOC (or the charge amount P) from the normal target charge state SOC_normal (or normal target charge amount P_normal) to the high target charge state SOC_hi (or high charge amount P_hi) is computed, and the position given by the distance lgen back to the destination C side from the point bb is set as the new point D.

If the route and running conditions from the destination C are the same on the next running occasion, the routine will shift to the high charge state shift control from the point D after this updating (new point D) on the next running occasion. The charge state SOC rises from the new point D in FIG. 7 by the same slope angle as the solid line between the point D–point b, and reaches SOC_hi at the point bb. As there is a change-over to EV running when the charge state SOC reaches SOC_hi, the charge state SOC falls with the same slope angle as that of the solid line between the point b–base point A, and is the minimum value SOC_low at the base point A (dot and dash line from new point D in FIG. 7).

If the point D is updated as shown in FIG. 7 and the route and running conditions from the destination C are the same on the next running occasion, the electric power of the battery 3 can be used up completely at the base point A.

The high charge state shift control prior to EV running performed by the general controller 16 and the learning control of EV running area performed by the navigation controller 18 will now be described in detail based on the following flowcharts. In the following flowcharts, although the charge state SOC is used for control, the charge state SOC may be replaced by the charge amount P.

Figure 9:
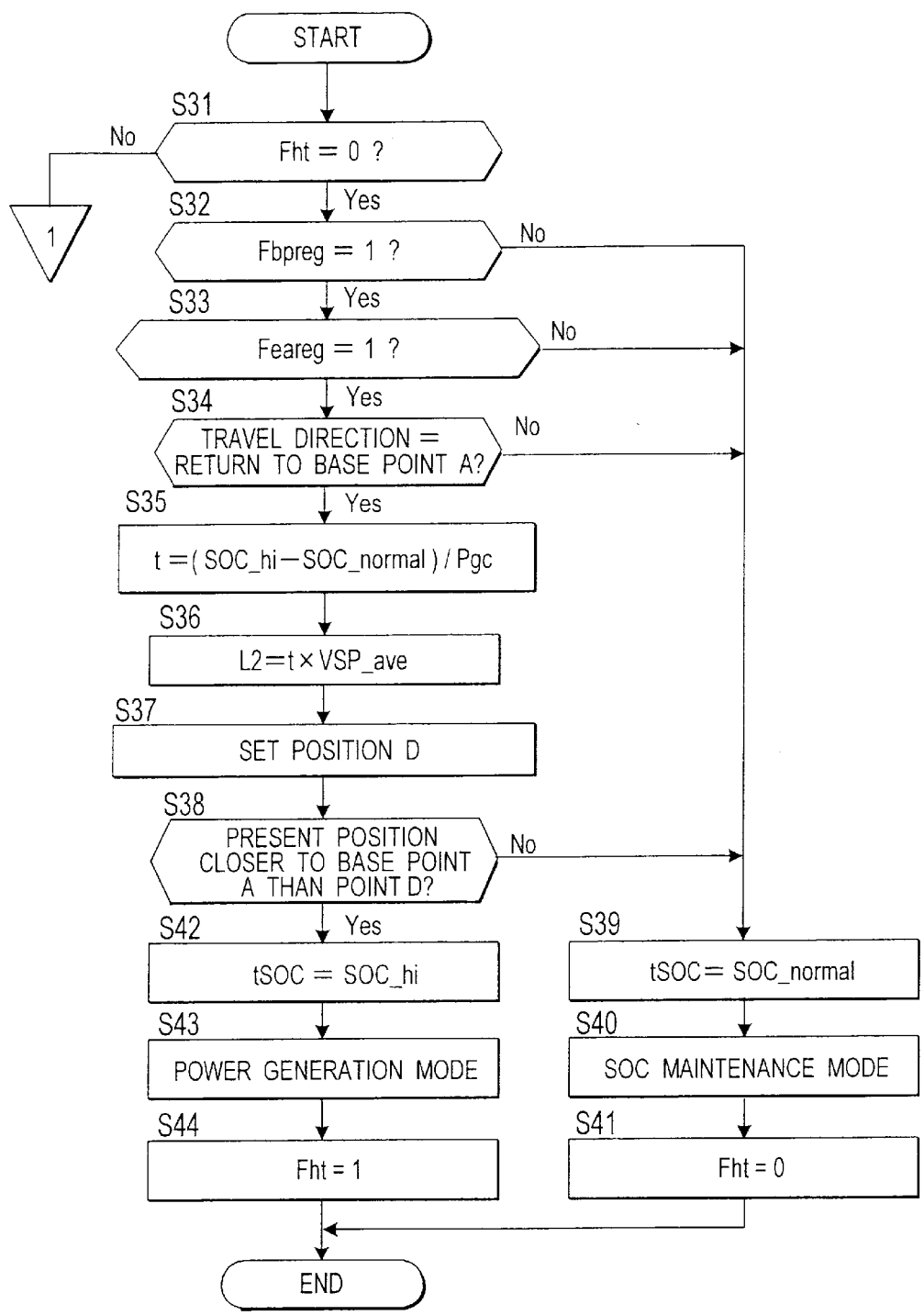
FIG. 9 is a flowchart the showing high charge state shift control.
Figure 10:
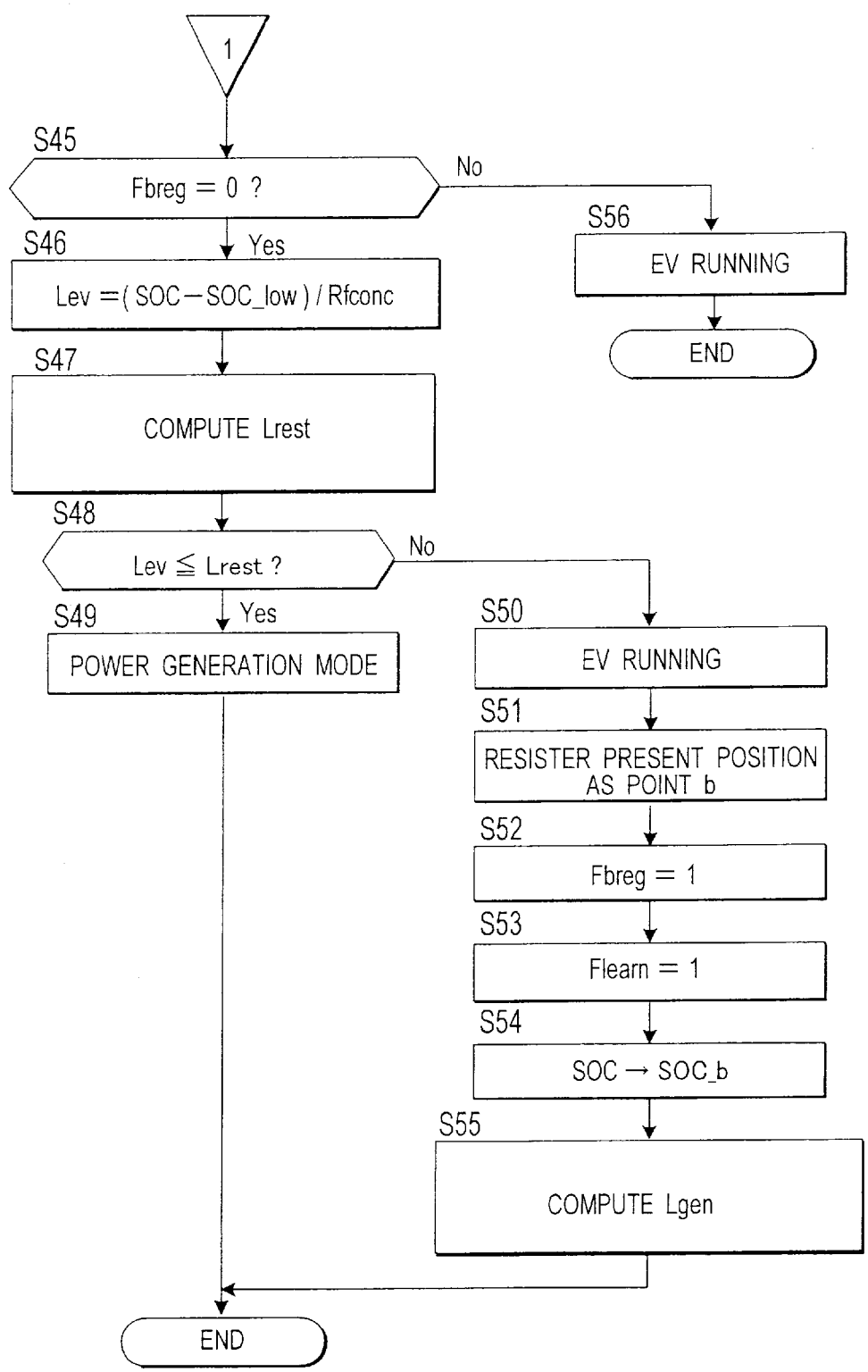
FIG. 10 is a flowchart showing the high charge state shift control.

FIG. 9 and FIG. 10 show the details of the high charge state shift control prior to EV running which is performed at a fixed interval on the return trip from the destination C.

In a step S31, a high target flag Fht is determined. If the high target flag Fht is "0", the target value of the charge state SOC is not the high target charge state SOC_hi, and if the high target flag Fht is "1", the target value of the charge state SOC is the high target charge state SOC_hi. As the high target flag Fht is "0" in the initial state at the destination C, the routine proceeds to steps S32, S33, S34, and it is determined whether or not all the following conditions are satisfied.

(a) The base point registration flag Fbpreg is "1."
(b) The EV running area registration flag Feareg is "1."
(c) The vehicle travel direction is returning to the base point A When all the conditions (a)–(c) are satisfied, the routine proceeds to a step S35, and the power generation time t required for the charge state SOC to reach the high target charge state SOC_hi at the point B is computed by the above-mentioned equation (1). In a step S36, the mileage L2 required for the charge state SOC to reach the high target charge state SOC_hi at the point B is computed by the above-mentioned equation (2). In a step S37, the position on the route given by this distance L2 back to the destination C from the point B is set as the point D.

In a step S38, the present position and the point D are compared. If the present position is closer to the destination C than the point D, the routine proceeds to steps S39, S40, S41, the target charge state tSOC is set to the normal target charge state SOC_normal, the mode is set to a charge state maintenance mode, and the high target flag Fht is set to "0."

If the present position reaches the point D, the routine proceeds to steps S42, S43, S44, the target charge state tSOC changes to the high target charge state SOC_hi, the mode is set to a power generation mode which charges the battery 3 so that SOC_hi may be obtained, and the high target flag Fht is set to "1."

When the high target flag Fht is set as "1", from the next time the routine is executed, the routine will proceed from the step S31 of FIG. 9 to a step S45 of FIG. 10, and the point b registration flag Fbreg will be determined. As the flag Fbreg is "0" at the time of the start of the return trip from the destination C, the routine proceeds to a step S46 and the distance Lev in which EV running is possible is computed by the above-mentioned equation (3) using the present charge state SOC.

In a step S47, the navigation controller 18 is directed to compute the distance on the route from the present position to the base point A and the result obtained is set as the residual distance Lrest to the base point A. In a step S48, the residual distance Lrest and the distance Lev in which EV running is possible using the present charge state SOC, are compared.

At the beginning of high charge state shift control, the residual distance Lrest to the base point A is longer than the distance Lev, so the routine proceeds to a step S49, and the power generation mode is selected.

When high charge state shift control is started, as the charge state SOC increases due to operation in the power generation mode, the possible EV running distance Lev in the above-mentioned equation (3) increases. On the other hand, the present position approaches the base point A, so the residual distance Lrest to the base point A decreases.

When the possible EV running distance Lev exceeds the residual distance Lrest, EV running can be performed until the base point A, so the routine proceeds from the step S48 to steps S50 and S51, and switches to EV running. The navigation controller 18 is commanded to register the present position of this change-over timing as the point b. In response to these commands, the point b is registered in the map data by the navigation controller 18. Hence, the registration of the point b is completed. In a step S52, the point b registration flag Fbreg is set to "1", and in a step S53, the learning permission flag Fleam is set to "1". A learning permission flag Fleam is initially set to "0" on starting the return trip from the destination C. By setting the point b registration flag Fbreg to "1", the routine proceeds to the step S56 from the step S45 on the next/occasion, and EV running is continued.

The charge state SOC_b at the point b where there was a change-over to EV running is stored in a memory, and the navigation controller 18 is further directed to calculate the distance on the route between the point D and point b. The result obtained is stored in a memory as a distance Lgen actually ran under high charge state shift control on the return trip (steps S54 and S55). These SOC_b and Lgen are needed for the learning control of the EV running area described next.

Figure 11:
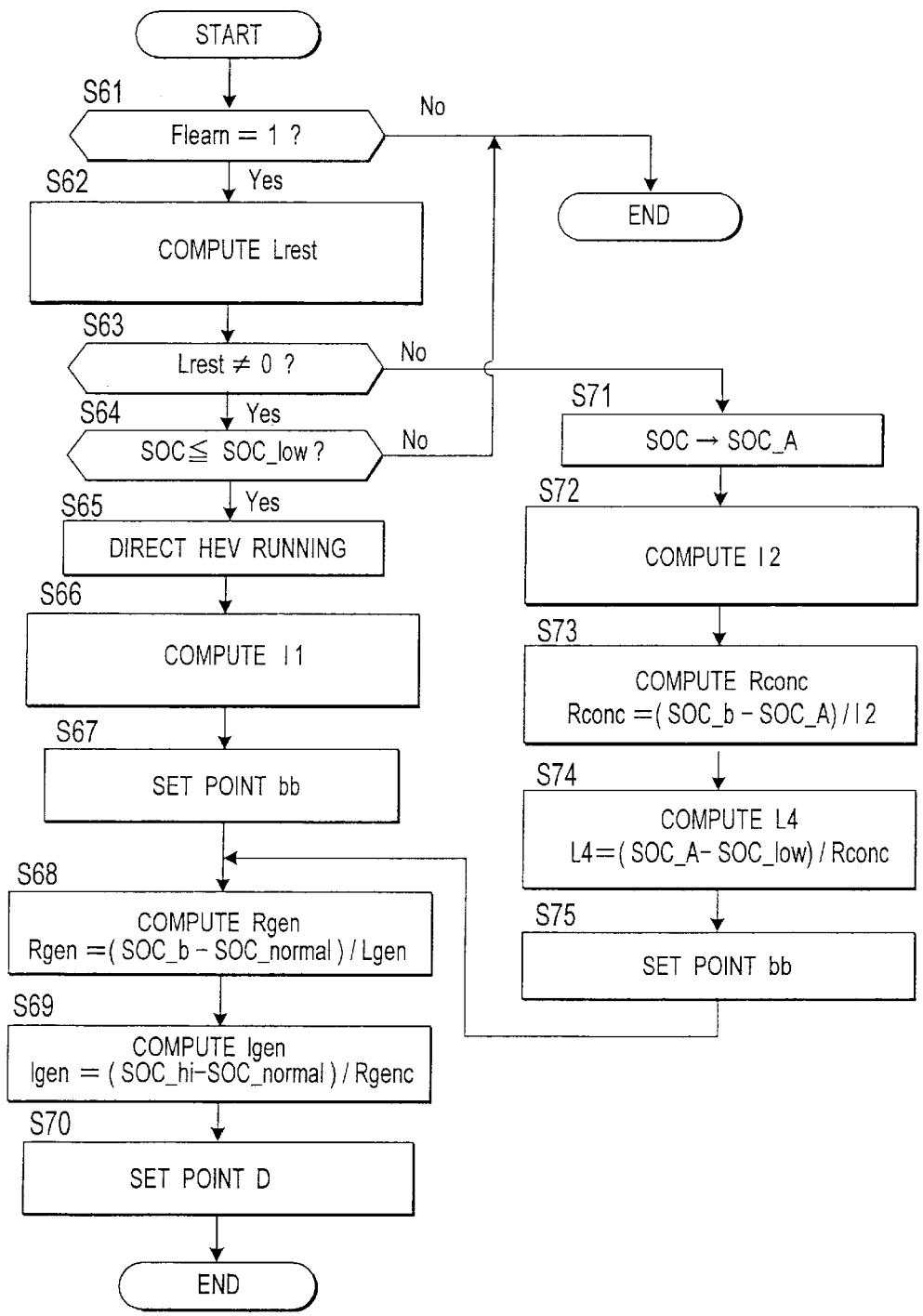
FIG. 11 is a flowchart showing the learning control of EV running area.

FIG. 11 shows the contents of the learning control of the EV running area (specifically, updating of the point D where high charge state shift control is started), and is performed at a fixed interval by the navigation controller 18 on the return trip from the destination C.

In a step S61, the learning permission flag Fleam is determined. The learning permission flag Fleam is set to "1" at the timing when the point b is registered (step S53 of FIG. 10).

When the learning permission flag Fleam is "1", the routine proceeds to a step S62, and the distance Lrest on the route from the present position to the base point A (residual distance) is computed.

In steps S63, 564, it is determined whether or not the charge state SOC became the minimum value SOC_low before reaching the base point A. If the present charge state SOC is in agreement with minimum value SOC_low and the residual distance Lrest is not zero (before reaching the base point A), it is determined that the charge state SOC became the minimum value SOC_low before reaching the base point A. In this case, as it is impossible to continue EV running, the routine proceeds to a step S65, and the general controller 16 is directed to switch to HEV running. In response to these directions, the general controller 16 switches to HEV running.

In steps S66–S70, the point D is updated so that the start timing of high charge state shift control is optimal on the next trip.

In the step S66, the distance l1 (EV running mileage) on the route from the present position to the point b is computed.

In a step S67, the position of the EV running mileage l1 from the base point A back to the destination C is searched on the route, and set as the point bb.

In a step S68, the power generation rate corresponding value Rgenc under high charge state shift control is computed by the above-mentioned equation (4) using SOC_b and Lgen which have already been obtained.

In a step S69, the mileage lgen required to increase the charge state SOC from SOC_normal to SOC_hi by the above-mentioned equation (5) with the power generation rate corresponding value Rgenc under high charge state shift control is computed using the power generation rate corresponding value Rgenc.

In a step S70, the position on the route of the distance lgen from the point bb back to the destination C is searched, and set as a new point D.

On the other hand, when the residual distance Lrest is zero, the routine proceeds from the step S63 to a step S71 (when the base point A is reached), and the charge state SOC_A at the base point A is stored in the memory.

In a step S72, the distance l2 (EV running mileage) on the route from the base point A to the point b is computed.

In a step S73, the power consumption rate corresponding value Rconc under EV running from the point b to the base point A (average value) is computed by the above-mentioned equation (6) based on this distance l2.

In a step S74, the estimated extra EV running distance L4 is computed by the above-mentioned equation (7) using the power consumption rate corresponding value Rconc. The distance L4 is the distance which can run from the base point A when EV running is performed until the electric power of the battery 3 is used up, when the electric power of the battery 3 cannot be used up at the base point A.

This includes the case when the electric power of the battery 3 is exactly used up at the base point A in the distance L4. If the battery 3 is exhausted at the base point A, SOC_A and SOC_low will become equal and the distance L4 will be zero.

In a step S75, the position of the sum total of this estimated extra EV running distance L4 and the EV running mileage l2 back to the destination C is searched on the route from the base point A, and set as the point bb. Then, steps S68, S69, and S70 are processed, and the new point D is searched and set.

Next, the operation of this embodiment is described.

According to this embodiment, the point at which a commercial power supply (external power supply), such as in a home or a company, are installed is registered as the base point A on the map data in the navigation device (map information device). The EV running area is registered on the map data centered on the base point A.

If the vehicle leaves the base point A where the battery 3 is charged using the commercial power supply by the fixed charger 23 (external charge device), EV running will be performed in the EV running area. When returning to the base point A from outside the EV running area, EV running will be performed if the vehicle enters the EV running area.

Hence, the area centered on the home or company becomes the EV running area, and the noise of the vehicle can be reduced especially when driving early to the office from home or returning late at night. Also, external charging energy which is more cost-effective than power generation by the engine can be used efficiently.

As the EV running area is determined when the charge state SOC of the battery 3 coincides with the predetermined minimum value SOC_low on arrival at the base point A, the electric power of the battery 3 can be used up on arrival at the base point A, and an economical commercial power supply (external power supply) which is cheap to run and has little environmental load can be used.

The procedure of registering EV running area in the map data in the above-mentioned map information device is:

(i) When the battery 3 is charged to the predetermined value SOC_chg (for example, 80%), EV running is started from the base point A.

(ii) When the charge state falls to the minimum value SOC_low, the position of the vehicle at this time is registered on the map data as the point B.

(iii) The distance L1 (EV running mileage L1) on the route from the point A to point B is computed using the map data.

(iv) For routes which have the same base point A but different from the route for which the EV running mileage L1 was computed, the points Bn are searched for which distance on the route from the base point A coincides with the EV running mileage L1.

(v) The area surrounded by the searched points Bn and point B is registered on the map data as the EV running area.

According to this procedure, when the vehicle leaves the base point A in FIG. 2 along the route R1 and exits the EV running area from the point B, the boundary points B1, B2 of the EV running area will be searched with that timing for other routes R2, R3 (having the same base point A), and these boundary points B1, B2 will also be registered as map data in the map information device.

Therefore, when approaching the EV running area while HEV running via the routes R2, R3 which are different from the outward trip, the change-over point to EV running can be estimated.

When EV running is performed toward the base point A from the boundary point B (or Bn) of the EV running area, as the power consumption rates differ greatly due to the effect of subsequent ruing load or auxiliary device load, (a) Before reaching the base point A, the electric power of the battery 3 is used up.

(b) When the vehicle reaches the base point A, the electric power of the battery 3 is not used up may arise.

In the case of (a), although it is the EV running area, it is impossible to continue EV running to the base point A, so the vehicle has to switch to HEV running, and the frequency of power generation by the engine 1 increases. Since EV running should be performed earlier in the case of (b), the EV running area is unnecessarily narrowed.

However, according to this embodiment, as the EV running area is learned based on transition of the charge state SOC at the time of performing EV running toward the base point A from the boundary of the EV running area so that the charge state SOC coincides with the minimum value SOC_low on arrival at the base point A, the situation (a) is avoided and the frequency of power generation by the engine 1 is suppressed, also, the situation (b) is avoided, and the EV running area can be expanded.

The charge state is effectively equal to a value in percent obtained by dividing the charge amount by the maximum charge amount. When the temperature of the battery 3 is low or when the battery 3 deteriorates, as the maximum charge amount which is this denominator decreases, the charge state SOC varies even if the charge amount is the same. Therefore, when controlling based on the charge state SOC, an error occurs in the control corresponding to this. However, if the charge amount is substituted for the charge state, even if the battery 3 is at a low temperature or deteriorates, an error will not arise in the control.

When it is intended to perform charging by the fixed charger at the base point A, if charging is performed by a mobile charger which is different from the fixed charger 23 at a position other than the base point A, it may occur that the vehicle cannot reach the base point A by EV running.

However, according to this embodiment, when charge is performed by the mobile charger, the attributes of the mobile charger do not coincide with the attributes stored in the vehicle, so the conditions for registering the base point on the map data are not satisfied, and registration is not performed. Therefore, the situation where the base point cannot be reached by EV running is avoided.

According to this embodiment, agreement of the attributes of the external charge device with the attributes in the vehicle means that a detection switch provided in the charge connector is ON, i.e., that the shape of the connector of the external charge device coincides with the shape of the connector on the vehicle and the charging pattern of the external charge device coincides with the charging pattern of the vehicle, but a further condition may be added that the charging capability of the external charge device is sufficient to charge the battery.

Although the external charge device was installed in a home or a company, the installation may be a public facility, a gas station, etc.

This embodiment performs learning control of EV running area combined with high charge state shift control. Although the case was described where not the EV running area itself but the point D at which high charge state shift control starts is updated, this invention can be applied also when not performing high charge state shift control.

For example, if the charge state SOC falls to the minimum value SOC_low before reaching the base point A, when EV running is performed toward the base point A from the boundary point B of the EV running area (or Bn), the distance L3 on the route from the present point E to the base point A may be computed, and the area narrowed by this distance L3 towards the base point A set as the EV running area.

If the charge state has not fallen to the minimum value at the base point A when EV running is performed toward the base point A from the boundary point B (or Bn) of the EV running area, the mileage L4 when EV running is continued from the charge state SOC_A at the base point A until it falls to the minimum value SOC_low, is estimated. Then, the area extended by this estimated distance L4 is set as the EV running area.

Although this embodiment is an example where this invention is applied to a parallel hybrid vehicle, it may be applied also to another type of hybrid vehicle, for example, a series hybrid vehicle.

Moreover, the data written in the map data of the recording medium 20 may be written in another recording medium, the memory of the navigation controller 18 or the memory of the general controller 16, and it may be combined with the map data of the recording medium 20 if necessary.

The entire contents of Japanese Patent Application P2001-217477 (filed Jul. 18, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A hybrid vehicle which includes a generator, an engine which drives the generator, a motor which drives the vehicle and a battery connected to the generator and motor, and performs EV running wherein the vehicle runs under the motor driven with electric power stored in the battery without operating the engine, and HEV running wherein the engine is operated and the vehicle runs under at least one of the engine and the motor, comprising:

an external charge device which charges the battery using an external power supply,
a map information device which includes map data and recognizes the present position of the vehicle on the map data, and
a controller which functions to:
register a point at which the external power supply is installed in the map data in the map information device as a base point,
register an EV running area centered on the base point in the map data in the map information device based on a charge value of the battery, and
perform EV running when the vehicle is in the EV running area.

2. The hybrid vehicle as defined in claim 1, wherein the controller further functions to perform EV running in the EV running area when the battery is charged using the external power supply by the external charge device and the vehicle starts from the base point.

3. The hybrid vehicle as defined in claim 1, wherein the controller further functions to perform EV running when the vehicle is returning to the base point from outside the EV running area, and the vehicle enters the EV running area.

4. The hybrid vehicle as defined in claim 3, wherein the EV running area is an area for which the vehicle can reach the base point before the charge value of the battery falls to a predetermined minimum charge value.

5. The hybrid vehicle as defined in claim 3, wherein the EV running area is determined so that the charge value of the battery coincides with a predetermined minimum charge value when the vehicle reaches the base point.

6. The hybrid vehicle as defined in claim 3, wherein the controller further functions to:
(a) perform EV running from the base point after the charge value of the battery is charged to a predetermined charge value,
(b) register the vehicle position on the map data in the map information device as a boundary point when the charge value has fallen to a predetermined minimum charge value,
(c) compute the distance on the route from the base point to the boundary point as the EV running mileage, using the map data in the map information device,
(d) search a point whose distance on the route from the base point coincides with the EV running mileage, for a route having the same base point different from the route for which the EV mileage was computed, and
(e) register the area around the searched point and the boundary point as the EV running area in the map data in the map information device.

7. The hybrid vehicle as defined in claim 3, wherein the controller further functions to:
update the EV running area so that the charge value coincides with a predetermined minimum charge value when the vehicle has arrived at the base point, based on the shift in the battery charge value when the vehicle performs EV running from the boundary of the EV running area to the base point.

8. The hybrid vehicle as defined in claim 7, wherein the controller further functions to:
compute the distance on the route between a point where the charge value has fallen to the predetermined minimum charge value and the base point when the vehicle performs EV running from the boundary of the EV running area to the base point and the charge value has fallen to the predetermined minimum charge value before arriving at the base point, and
narrow the EV running area by this distance toward the base point.

9. The hybrid vehicle as defined in claim 8, wherein the controller further functions to:
estimate the distance in which the EV running is still possible until the charge value at the base point falls to the predetermined minimum value, when the charge value has not fallen to the predetermined minimum charge value at the base point when the vehicle performs EV running from the boundary of the EV running area to the base point, and expand the EV running area by the estimated distance.

10. The hybrid vehicle as defined in claim 1, wherein the controller further functions to register the base point on the map data in the map information device when the attributes of the external charge device match the attributes in the vehicle when charging is performed using the external power supply by the external charge device.

11. The hybrid vehicle as defined in claim 1, wherein the charge value is the charge state of the battery.

12. The hybrid vehicle as defined in claim 1, wherein the charge value is the charge amount of the battery.

13. A hybrid vehicle which includes a generator, an engine which drives the generator, a motor which drives the vehicle and a battery connected to the generator and motor, and performs EV running wherein the vehicle runs under the motor driven with electric power stored in the battery without operating the engine, and HEV running wherein the engine is operated and the vehicle runs under at least one of the engine and the motor, comprising:

external charge means for charging the battery using an external power supply, a map information device which includes map data and recognizes the present position of the vehicle on the map data, means for registering a point at which the external power supply is installed in the map data in the map information device as a base point, means for registering an EV running area centered on the base point in the map data in the map information device based on a charge value of the battery, and means for performing EV running when the vehicle is in the EV running area.

* * * * *